(12) United States Patent
Broughton

(10) Patent No.: US 8,932,066 B2
(45) Date of Patent: Jan. 13, 2015

(54) ELECTRICAL HARNESS CONNECTOR

(71) Applicant: Rolls-Royce PLC, London (GB)

(72) Inventor: Paul Broughton, Leicester (GB)

(73) Assignee: Rolls-Royce plc, London (GB)

( * ) Notice: Subject to any disclaimer, the term of this patent is extended or adjusted under 35 U.S.C. 154(b) by 119 days.

(21) Appl. No.: 13/659,336

(22) Filed: Oct. 24, 2012

(65) Prior Publication Data

US 2013/0115788 A1  May 9, 2013

(30) Foreign Application Priority Data

Nov. 4, 2011  (GB) .................................. 1119050.1

(51) Int. Cl.
| | |
|---|---|
| H01R 12/00 | (2006.01) |
| H01R 12/78 | (2011.01) |
| H01R 12/61 | (2011.01) |

(52) U.S. Cl.
CPC ................ *H01R 12/78* (2013.01); *H01R 12/61* (2013.01)
USPC ............................................. 439/67; 439/74

(58) Field of Classification Search
CPC ........ H01R 9/096; H01R 12/62; H01R 12/79; H01R 13/725; H01R 23/722; H01R 25/003; H01R 25/006; H01R 31/00; H01R 31/06
USPC ............... 439/67, 74, 75, 329, 369, 492–495, 439/638, 650–655
See application file for complete search history.

(56) References Cited

U.S. PATENT DOCUMENTS

| | | | | |
|---|---|---|---|---|
| 4,526,432 | A | * | 7/1985 | Cronin et al. .................. 439/320 |
| 4,647,133 | A | * | 3/1987 | Renken et al. ................ 439/426 |
| 4,975,068 | A | * | 12/1990 | Squires ............................ 439/67 |
| 5,482,473 | A | * | 1/1996 | Lord et al. ...................... 439/67 |
| 5,567,167 | A | | 10/1996 | Hayashi |

(Continued)

FOREIGN PATENT DOCUMENTS

| | | |
|---|---|---|
| DE | 32 35 212 A1 | 3/1984 |
| EP | 0 106 990 A1 | 5/1984 |

(Continued)

OTHER PUBLICATIONS

Search Report issued in British Application No. 1119050.1 dated Mar. 2, 2012.

(Continued)

*Primary Examiner* — Thanh Tam Le
(74) *Attorney, Agent, or Firm* — Oliff PLC

(57) ABSTRACT

A connector is provided for joining two electrical harnesses. Each harness is formed from a flexible printed circuit board which provides a plurality of conductive tracks, and each harness has a substantially planar terminating region at which the conductive tracks of the harness fan out. One or more receiving holes are formed in each terminating region to extend to respective conductive tracks. Each receiving hole extends in a direction substantially perpendicularly to the plane of the respective terminating region. When in use, the connector includes a connection formation between respective terminating regions of the two electrical harnesses. The connector further includes a housing configured to hold the respective terminating regions of the two electrical harnesses in face-to-face relationship with the connection formation. The housing has one or more apertures through which the harnesses can exit the housing as they extend away from their terminating regions.

12 Claims, 5 Drawing Sheets

(56) References Cited

U.S. PATENT DOCUMENTS

| | | | |
|---|---|---|---|
| 5,620,782 A | 4/1997 | Davis et al. | |
| 5,770,818 A | 6/1998 | Tanaka et al. | |
| 5,805,402 A | 9/1998 | Maue et al. | |
| 5,827,081 A | 10/1998 | Sakamaki | |
| 6,024,580 A | 2/2000 | Dangler et al. | |
| 6,299,469 B1 * | 10/2001 | Glovatsky et al. | 439/329 |
| 7,033,208 B1 | 4/2006 | Huang et al. | |
| 7,095,601 B2 | 8/2006 | Mehrer et al. | |
| 7,223,105 B2 * | 5/2007 | Weiss et al. | 439/66 |
| 7,553,166 B2 * | 6/2009 | Gobron | 439/67 |
| 7,731,517 B2 * | 6/2010 | Lee et al. | 439/271 |
| 7,980,863 B1 * | 7/2011 | Holec et al. | 439/67 |
| 8,529,276 B2 * | 9/2013 | Esquivel et al. | 439/67 |
| 8,529,277 B2 * | 9/2013 | Williams et al. | 439/75 |
| 8,668,503 B2 * | 3/2014 | Williams et al. | 439/75 |
| 2003/0092295 A1 | 5/2003 | Lin | |
| 2003/0092296 A1 | 5/2003 | Oldenburg et al. | |
| 2004/0018757 A1 | 1/2004 | Lang et al. | |
| 2005/0079772 A1 | 4/2005 | DeLessert | |
| 2005/0118864 A1 | 6/2005 | Watanabe et al. | |
| 2007/0184682 A1 | 8/2007 | Gobron | |
| 2009/0233465 A1 * | 9/2009 | Mizoguchi | 439/74 |
| 2012/0315773 A1 | 12/2012 | Esquivel et al. | |
| 2012/0315774 A1 | 12/2012 | Williams et al. | |

FOREIGN PATENT DOCUMENTS

| | | |
|---|---|---|
| EP | 0 198 566 A2 | 10/1986 |
| EP | 0 261 527 A2 | 3/1988 |
| EP | 0 440 305 A1 | 8/1991 |
| EP | 0 911 913 A2 | 4/1999 |
| FR | 2 830 375 A1 | 4/2003 |
| GB | 929802 | 6/1963 |
| GB | 2 070 349 A | 9/1981 |
| GB | 2461017 A | 12/2009 |
| GB | 2463867 A | 3/2010 |
| JP | 07-263049 | 10/1995 |

OTHER PUBLICATIONS

Search Report issued in British Application No. 1219084.9 dated Feb. 27, 2013.
Search Report issued in British Application No. 1219088.0 dated Feb. 22, 2013.
Search Report issued in British Application No. 1119045.1 dated Mar. 2, 2012.
U.S. Appl. No. 13/659,324, filed Oct. 24, 2012.
Search Report issued in European Patent Application No. 12 18 9697 dated Apr. 4, 2013.
British Search Report for Application No. 1308028.8 issued Oct. 28, 2013.
British Search Report for Application No. 1308029.6 issued Oct. 28, 2013.
U.S. Appl. No. 14/260,614, filed Apr. 24, 2014.
U.S. Appl. No. 14/260,610, filed Apr. 24, 2014.
May 19, 2014 Office Action issued in U.S. Appl. No. 13/659,324.
Search Report issued in European Patent Application No. 14 16 2598 dated May 28, 2014.
Office Action dated Nov. 3, 2014 issued in U.S. Appl. No. 13/659,324.
European Search Report dated Nov. 24, 2014 issued in European Patent Application No. 12189707.8.

* cited by examiner

ELECTRICAL HARNESS CONNECTOR

CROSS-REFERENCE TO RELATED APPLICATIONS

This application is based upon and claims the benefit of priority from British Patent Application Number 1119050.1 filed 4 Nov. 2011, the entire contents of which are incorporated by reference.

FIELD OF THE INVENTION

The present invention relates to a connector for joining two electrical harnesses, each harness being formed from a flexible printed circuit board which provides a plurality of conductive tracks.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

A typical gas turbine engine has a substantial number of electrical components which serve, for example, to sense operating parameters of the engine and/or to control actuators which operate devices in the engine. Such devices may, for example, control fuel flow, variable vanes and air bleed valves. The actuators may themselves be electrically powered, although some may be pneumatically or hydraulically powered, but controlled by electrical signals.

Electrical power, and signals to and from the individual electrical components, are commonly transmitted along conductors. Conventionally, such conductors may be in the form of wires and cables which are assembled together in a harness. In such a conventional harness, each wire may be surrounded by an insulating sleeve. The connections between the individual components and the conventional harness are made, for example, by multi-pin plug and socket connectors. Similarly, communication between the harness and power, control and signalling circuitry is achieved through a multi-pin connector.

By way of example, FIG. 2 of the accompanying drawings shows a typical gas turbine engine including two conventional wiring harnesses 102, 104, each provided with a respective connector component 106, 108 for connection to circuitry accommodated within the airframe of an aircraft in which the engine is installed.

The harnesses 102, 104 are assembled from individual wires and cables which are held together over at least part of their lengths by suitable sleeving or braiding. Individual wires and cables, for example those indicated at 110, emerge from the sleeving or braiding to terminate at plug or socket connector components 112 for cooperation with complementary socket or plug connector components 114 on, or connected to, the respective electrical components.

Each conventional harness 102, 104 therefore comprises a multitude of insulated wires and cables. This makes the conventional harness bulky, heavy and difficult to manipulate. It is desirable to reduce the size and weight of components on gas turbine engines, particularly, for example, gas turbine engines for use on vehicles, such as aircraft.

It is proposed to replace conventional harnesses with flexible printed circuit board harnesses (FPCB harnesses). An example of a portion of a flexible printed circuit board harness 120 is shown in FIGS. 3 to 6. FIG. 3 shows a perspective view of an FPCB harness portion, and FIGS. 4, 5, and 6 show side, top, and cross-sectional views respectively.

The FPCB harness 120 typically comprises a flexible (for example elastically deformable) substrate 140 with conductive tracks 130 laid/formed therein. The FPCB harness 120 may thus be deformable. In the example shown in FIGS. 3 to 6, the FPCB harness 120 extends along a length in the x-direction, a width in the y-direction, and a thickness (or height or depth) in the z-direction. The x direction may be defined as the axial direction of the FPCB harness. Thus, the x-direction (and thus the z-direction) may change along the length of the FPCB harness 20 as the FPCB harness is deformed. The x-y surface(s) may be said to be the major surface(s) of the FPCB harness. In the example shown in FIGS. 3 to 6, the FPCB harness is deformable in the z direction, i.e. in a direction perpendicular to the major surface. FPCB harnesses may be additionally of alternatively deformable about any other direction, and/or may be twisted about any one or more of the x, y, or z directions.

The flexible substrate 140 is typically a dielectric, and the conductive tracks 130, which may be surrounded be the substrate, are typically formed using a suitable conductive material. The conductive tracks 130 may be used to conduct/transfer electrical signals and/or electrical power, for example around a gas turbine engine and/or to/from components of a gas turbine engine. The size (for example the cross-sectional area) and/or the shape of the conductive tracks 130 can depend on the signal to be transmitted through the particular conductive track 130. Thus, the shape and/or size of the individual conductive tracks 130 may or may not be uniform in a FPCB harness 120.

The example shown in FIGS. 3 to 6 has two layers of conductive tracks 130 running through the substrate 140, with three tracks in each layer. However, the number of layers and the number of tracks in the FPCB harness 120 can vary.

Using an FPCB harness to transmit electrical signals and/or power can be advantageous over a conventional harness, for example because of its reduced size, weight and/or complexity.

FIG. 7 shows a diagrammatic representation of an FPCB harness for an engine. The harness comprises a trunk 136 extending between connectors 141, 142, and a plurality of integral spurs 144 terminating at connectors 146. The trunk 136 and spurs 144 are generally flat, parallel to the plane of FIG. 7, but may be curved in that plane for ease of routing of the harness over the gas turbine engine. At least some of the tracks of the FPCB extend both along the trunk 136 and the respective spurs 144.

OBJECTS AND SUMMARY OF THE INVENTION

Although connectors for joining FPCB harnesses to electrical components are known, it is desirable also to be able to join one harness to another harness.

Accordingly, in a first aspect, the present invention provides a connector for joining two electrical harnesses, each harness being formed from a flexible printed circuit board which provides a plurality of conductive tracks, and each harness having a substantially planar terminating region at which the conductive tracks of the harness fan out, wherein one or more receiving holes are formed in each terminating region to extend to respective conductive tracks, and each receiving hole extends in a direction substantially perpendicularly to the plane of the respective terminating region, the connector including:
- a connection formation which, in use, is sandwiched between respective terminating regions of the two electrical harnesses, the connection formation having one or more pins which are arranged so that one end of each pin enters a receiving hole of one of the terminating regions and the other end of the pin enters a receiving hole of the other of the terminating regions to electrically connect the respective conductive tracks; and
- a housing configured to hold the respective terminating regions of the two electrical harnesses in face-to-face relationship with the connection formation sandwiched therebetween, the housing having one or more apertures through which the harnesses can exit the housing as they extend away from their terminating regions.

Advantageously, the connector allows two harnesses to be joined together in a manner which can enable repeated in situ connection/disconnection of the harnesses, and which is suitable for high vibration environments, such as gas turbine engines.

In a second aspect, the present invention provides an arrangement of two electrical harnesses, each harness being formed from a flexible printed circuit board which provides a plurality of conductive tracks, and each harness having a substantially planar terminating region at which the conductive tracks of the harness fan out, wherein one or more receiving holes are formed in each terminating region to extend to respective conductive tracks, each receiving hole extends in a direction substantially perpendicularly to the plane of the respective terminating region, and the harnesses are joined at their terminating regions by a connector according to the first aspect.

In a third aspect, the present invention provides a gas turbine engine having the arrangement of two electrical harnesses according to the second aspect.

Optional features of the invention will now be set out. These are applicable singly or in any combination with any aspect of the invention.

The receiving holes can be through holes or blind holes, as appropriate. The receiving holes may optionally include respective embedded sockets which engage with the ends of the pins and are connected to the conductive tracks of the respective harness.

Preferably, the housing is openable to allow the terminating regions to be separated from the connection formation. For example, the housing can be formed from two joinable half shells.

Preferably, the housing sealingly encloses the terminating regions and the connection formation. Ingress of contaminants into the connector can thus be avoided.

The connection formation may have a substantially planar retaining body which holds the pins in fixed positions relative thereto, the ends of each pin projecting from opposing sides of the body. Typically the terminating regions are press fittable onto their respective pin ends. The retaining body facilitates such a press fitting arrangement. The retaining body may have substantially the same shape as the terminating regions. The terminating regions may be, for example, disc-shaped or rectangular.

The or each pin may have a respective central flange which extends perpendicularly to the direction of the pin. The flange can help to ensure that its pin extends in the correct direction when the connection formation is sandwiched between the respective terminating regions of the electrical harnesses. For example, the flange can mechanically fix its pin in the retaining body.

The connector may further include a fixation formation which urges the terminating regions into engagement with the connection formation. In this way, excessive vibration of the connection formation relative to the terminating regions can be avoided, such vibration being a cause of possible premature failure of the connector. The fixation formation may be provided by two resilient members which sandwich the terminating regions and connection formation therebetween, each resilient member being compressed between the adjacent terminating region and the housing.

In order to improve the electrical connection of the pins to the conductive tracks, substantially the whole of the inner surface of the or each receiving hole may be coated with an electrically conducting layer.

Further optional features of the invention are set out below.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS

Figure 1:
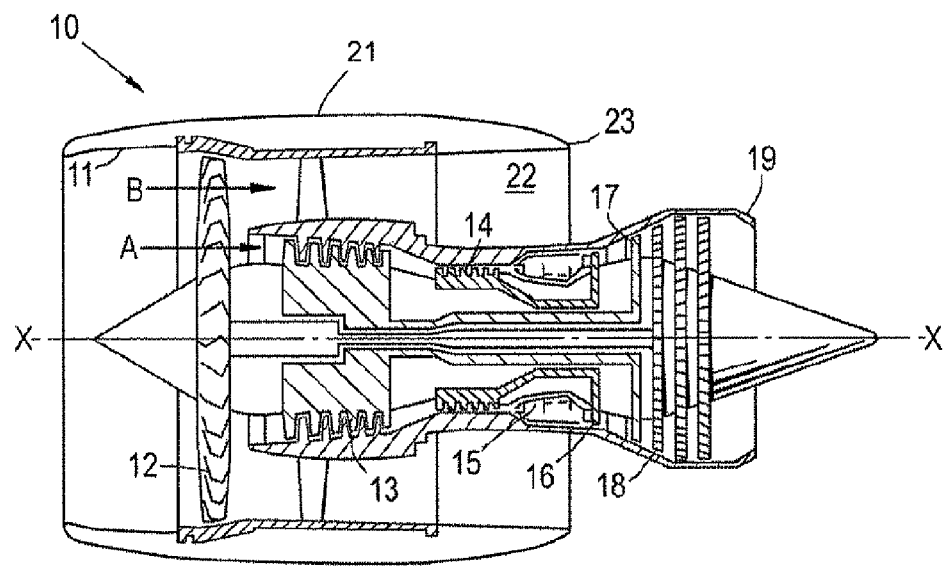
FIG. 1 shows a schematic longitudinal cross-sectional view through a ducted fan gas turbine engine.
Figure 2:
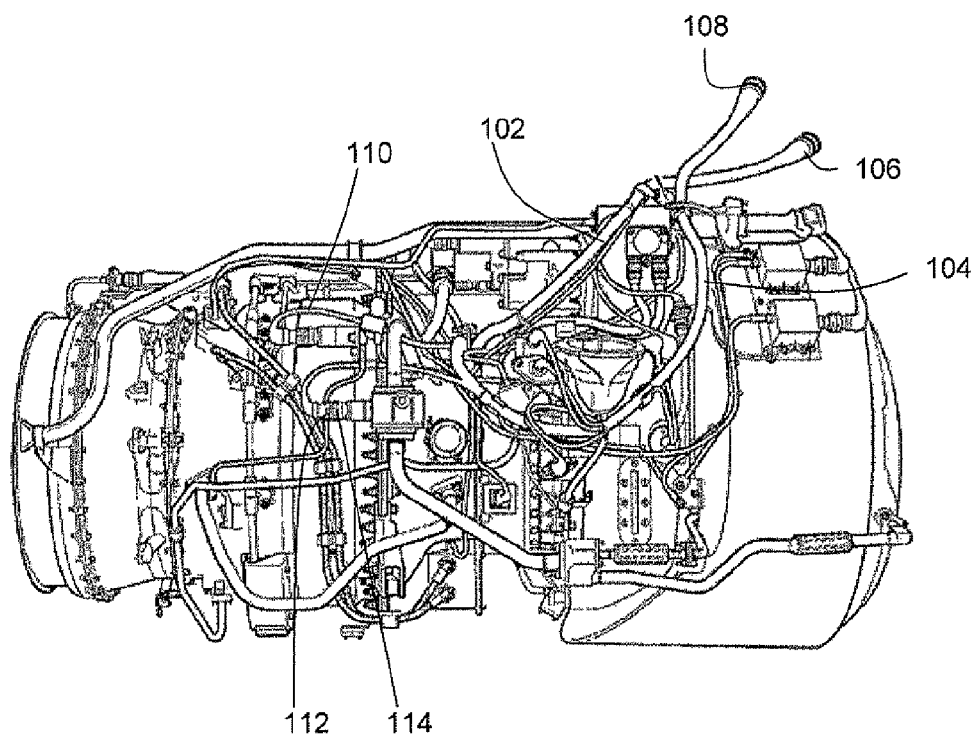
FIG. 2 shows a gas turbine engine with a conventional harness.
Figure 3:
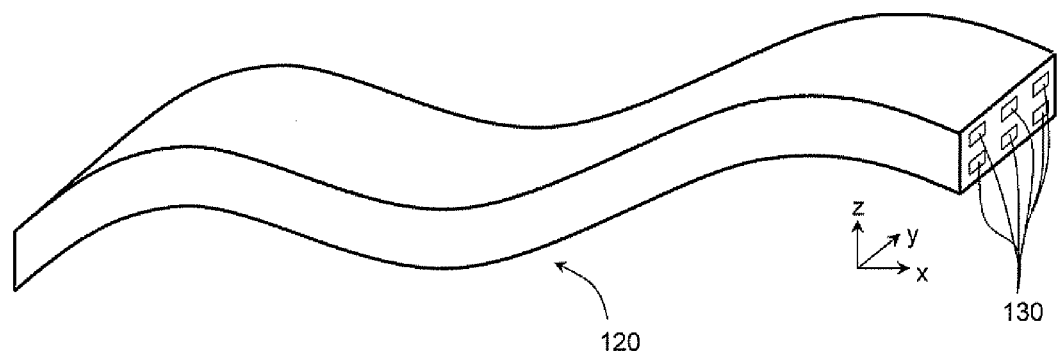
FIG. 3 shows a schematic perspective view of a portion of a flexible printed circuit board harness.
Figure 4:
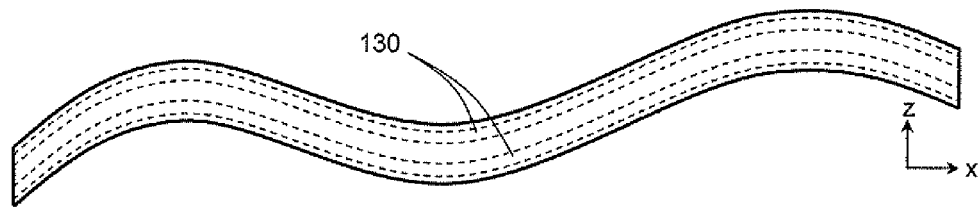
FIG. 4 shows a side view of the flexible printed circuit board harness of FIG. 3.
Figure 5:
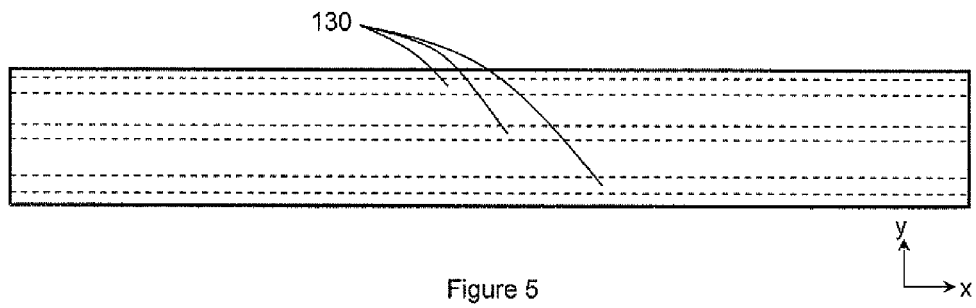
FIG. 5 shows a top view of the flexible printed circuit board harness of FIG. 3.
Figure 6:
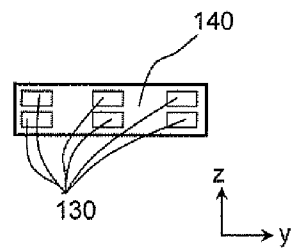
FIG. 6 shows a transverse cross-sectional view of the flexible printed circuit board harness of FIG. 3.
Figure 7:
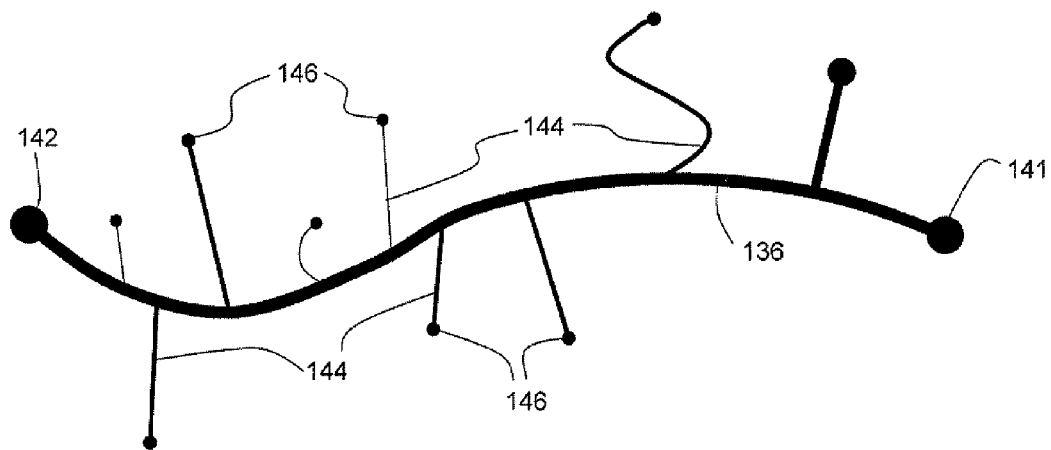
FIG. 7 shows a diagrammatic representation of a flexible printed circuit board harness for an engine.
Figure 8:
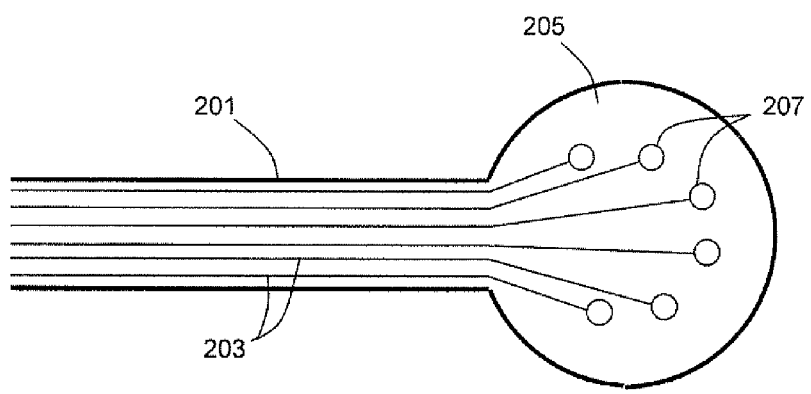
FIG. 8 shows schematically a portion of an electrical harness formed from a flexible printed circuit board.

FIG. 8 shows schematically a portion of a gas turbine engine electrical harness formed from a flexible printed circuit board 201 which provides a plurality of conductive tracks 203, optionally in multiple layers. The portion ends at a planar, disc-shaped terminating region 205 in which the conductive tracks fan out and join to respective receiving holes 207 which penetrate through the terminating region perpendicularly to the plane of the region. The holes are internally plated with an electrically conductive layer.

Figure 9:
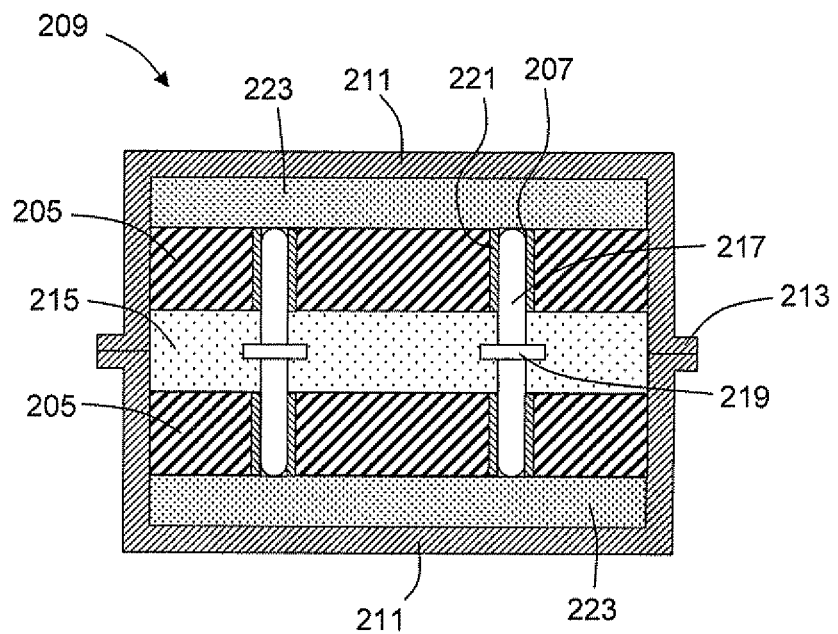
FIG. 9 shows schematically a transverse cross-sectional view through an embodiment of a connector which joins two electrical harnesses of the type shown in FIG. 8 at their respective terminating regions.

FIG. 9 shows schematically a transverse longitudinal cross-sectional view through a connector 209 which joins two electrical harnesses of the type shown in FIG. 8 at their respective terminating regions 205.

The connector 209 has a housing formed from two half shells 211. The half shells are clamped together at respective flange formations 213. The terminating regions 205 are positioned face-to-face in the housing with a correspondingly disc-shaped retaining body 215 of a connection formation sandwiched therebetween. The connection formation also includes a plurality of pins 217 (only two shown in FIG. 9) held in fixed positions relative to the retaining body 215, the ends of each pin projecting from opposing sides of the body. The pins can have central flanges 219, which mechanically fix the pins in the retaining body and ensure that the pins extend in the correct direction (in this case perpendicularly to the plane of the retaining body).

The ends of each pin 217 enter respective receiving holes 207 of the terminating regions 205. In this way, the pins electrically connect the conductive tracks 203 of one harness to the conductive tracks 203 of the other harness. The internal plating 221 of the holes improves electrical contact with the pins.

The half shells 211 also contain respective elastomeric resilient layers 223 which form a fixation formation urging the terminating region 205 into engagement with the retaining body 215. This helps to prevent vibration of the terminating regions 205 in the housing, such vibration being a cause of fretting which can lead to premature failure of the connector 209. More specifically, the elastomeric layers 223 sandwich the terminating region 205 and are put into compression when the half shells 211 are clamped together. The elastomeric layers 223 can be separate components, or parts of the respective terminating regions and/or the half shells. Likewise, the half shells can be separate components or parts of the respective terminating regions. The pins 217 can extend through the terminating regions to abut the layers 223 (as shown in FIG. 9), or alternatively they can fall short of the layers 223 (and optionally then abut the terminating regions).

The half shells 211 can be unclamped to open the housing, allowing the terminating regions 205 to be easily separated from the pins 217. The terminating regions can then be readily reconnected by press fitting onto the pins and closing the housing. Both operations are performable on-wing.

The flexible harnesses extend from the terminating regions 205 and exit the connector at one or more apertures (not shown) formed in the housing.

The housing may be adapted to sealingly enclose the terminating regions 205 and the retaining body 215 and pins 217 of the connection formation. For example, the connector 209 may have rubber boot to discourage the ingress of contaminants into the connector and to provide support for the flexible harnesses as they leaves the connector.

Advantageously, the use in the connector 209 of hot joining techniques, such as soldering, which are incompatible with on-wing working on a fuelled engine, can be avoided.

Figure 10:
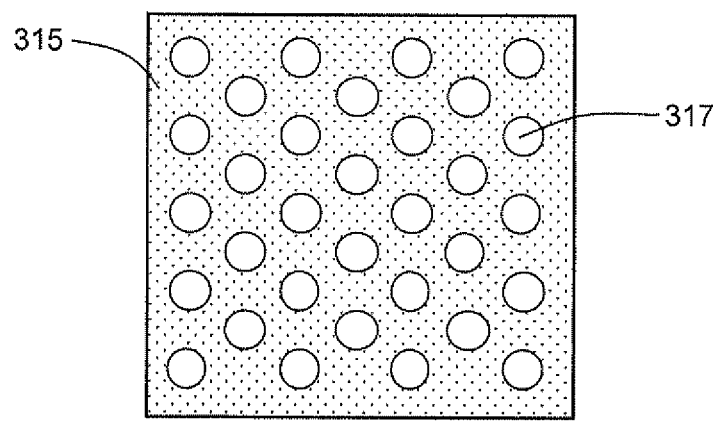
FIG. 10 shows schematically a top view of a connection formation of a further embodiment of a connector which joins two electrical harnesses.

FIG. 10 shows schematically a top view of a connection formation of a further embodiment of a connector. In this embodiment, the terminating regions of the respective flexible printed circuit boards are rectangular, and the connection formation has a correspondingly rectangular retaining body 315 which contains a regular array of 32 pins 317. More than one connection formation can be used in a given connector to join the face-to-face positioned terminating regions. For example, two connection formations of the type shown in FIG. 10 can be placed side-by-side to provide 64 pins extending between the terminating regions.

Figure 11:
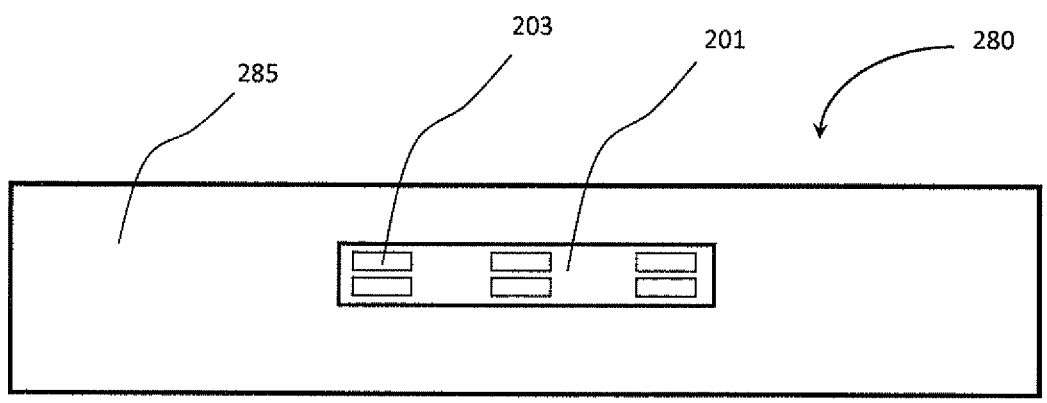
FIG. 11 shows a diagrammatic representation of a flexible printed circuit board embedded in a rigid material.

At least a part of one or both of the flexible printed circuit boards 201 being connected together may be embedded in a rigid material 285, as shown in FIG. 11 by way of example. For example, along at least a part of its length, the flexible printed circuit board 201 may be fixed inside a rigid material 285 to form a rigid structure 280, which may be referred to as a rigid raft 280. Thus, one or both of the electrical harnesses being joined together may comprise rigid structure through which the flexible printed circuit board 201 runs. Such a rigid structure may be readily mounted on or fixed to another component, for example a gas turbine engine.

The rigid material 285 may be, for example, a composite material of fibre and filler, such as carbon fibre. Any suitable method may be used to manufacture such a rigid structure 280 such as, for example, placing the flexible printed circuit board 201 between flexible layers of a composite material (or "laying-up" the flexible composite material), and then moulding to the desired shape and treating (for example heat and/or pressure treating) to form a rigid composite structure.

While the invention has been described in conjunction with the exemplary embodiments described above, many equivalent modifications and variations will be apparent to those skilled in the art when given this disclosure. For example, the housing may incorporate a bonding feature for grounding electro-magnetic shielding of the flexible harnesses to the housing. Accordingly, the exemplary embodiments of the invention set forth above are considered to be illustrative and not limiting. Various changes to the described embodiments may be made without departing from the spirit and scope of the invention.

I claim:

1. A connector for joining two electrical harnesses, each of the harnesses being formed from a flexible printed circuit board including a plurality of conductive tracks, and each of the harnesses having a substantially planar terminating region at which the conductive tracks fan out, wherein one or more receiving holes are formed in each terminating region to extend to respective conductive tracks, and each of the one or more receiving holes extends in a direction substantially perpendicularly to a plane of the respective substantially planar terminating region, the connector including:

a connection formation, wherein the connection formation, in use, is sandwiched between respective terminating regions of the two electrical harnesses, the connection formation having one or more pins arranged so that one end of each of the one or more pins enters one of the one or more receiving holes of one of the terminating regions and the other end of the pin enters one of the one or more receiving holes of the other of the terminating regions to electrically connect the respective conductive tracks;

a housing configured to hold the respective terminating regions of the two electrical harnesses in face-to-face relationship with the connection formation sandwiched therebetween, the housing having one or more apertures through which the harnesses can exit the housing as each of the harnesses extends away from the terminating region of the harness; and a fixation formation, wherein the fixation formation urges the terminating regions into engagement with the connection formation, and the fixation formation is provided by two resilient members, each of the resilient members being compressed between the housing and an adjacent one of the terminating regions, the two resilient members sandwiching the terminating regions and the connection formation therebetween.

2. A connector according to claim 1, wherein the housing is openable to allow the terminating regions to be separated from the connection formation.

3. A connector according to claim 1, wherein the housing sealingly encloses the terminating regions and the connection formation.

4. A connector according to claim 1, wherein the connection formation has a substantially planar retaining body which holds the pins in fixed positions relative thereto, the ends of each of the one or more pins projecting from opposing sides of the body.

5. A connector according to claim 4, wherein the retaining body has substantially the same shape as the terminating regions.

6. A connector according to claim 1, wherein each of the one or more pins has a respective central flange extending perpendicularly to a longitudinal direction of the pin.

7. A connector according to claim 1, wherein substantially the whole of an inner surface of each of the one or more receiving holes is coated with an electrically conducting layer.

8. An arrangement comprising the two electrical harnesses joined at the terminating region of each of the harnesses by the connector according to claim 1.

9. An arrangement according to claim 8, wherein a part of one or both of the respective flexible printed circuit boards of the two electrical harnesses is embedded in a rigid material.

10. An arrangement according to claim 9, wherein the rigid material is a rigid composite material.

11. A gas turbine engine having the arrangement according to claim 8.

12. A connector for joining two electrical harnesses, each of the harnesses being formed from a flexible printed circuit board including a plurality of conductive tracks, and each of the harnesses having a substantially planar terminating region at which the conductive tracks fan out, wherein one or more receiving holes are formed in each terminating region to extend to respective conductive tracks, and each of the one or more receiving holes extends in a direction substantially perpendicularly to a plane of the respective substantially planar terminating region, the connector including:

a connection formation, wherein the connection formation, in use, is sandwiched between respective terminating regions of the two electrical harnesses, the connection formation having one or more pins arranged so that one end of each of the one or more pins enters one of the one or more receiving holes of one of the terminating regions and the other end of the pin enters one of the one or more receiving holes of the other of the terminating regions to electrically connect the respective conductive tracks; and a housing configured to hold the respective terminating regions of the two electrical harnesses in face-to-face relationship with the connection formation sandwiched therebetween, the housing having one or more apertures through which the harnesses can exit the housing as each of the harnesses extends away from the terminating region of the harness, and wherein the housing sealingly encloses the terminating regions and the connection formation.

\* \* \* \* \*